Patented July 14, 1942

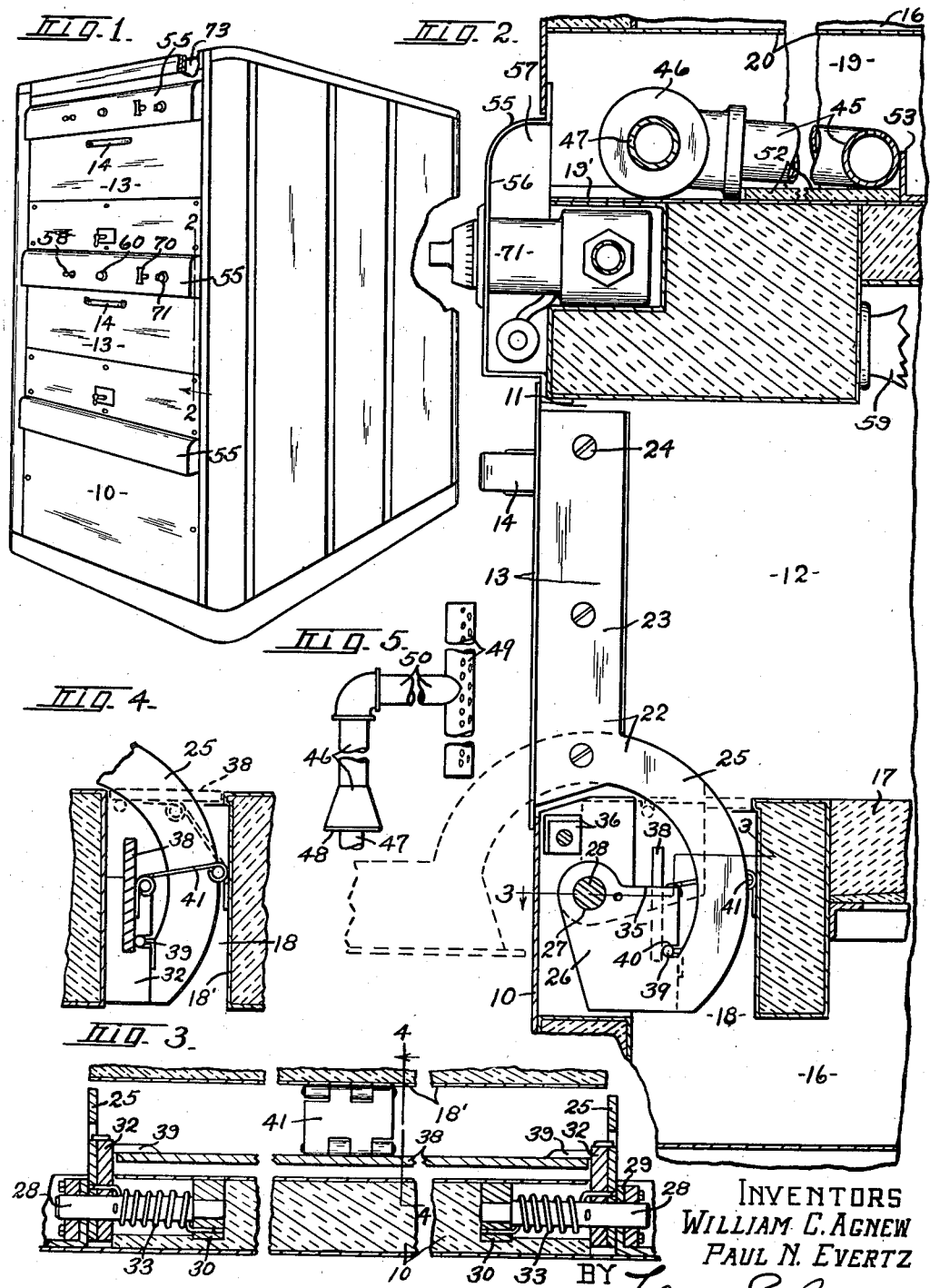

2,290,136

UNITED STATES PATENT OFFICE 2,290,136

BAKE OVEN

William C. Agnew and Paul N. Evertz, Syracuse, N. Y., assignors to Martin Oven Company, Inc., Syracuse, N. Y., a corporation of New York Application September 10, 1940, Serial No. 356,202

3 Claims. (Cl. 107—55)

Our invention relates to improvements in bake ovens in which a heating chamber is arranged beneath the baking chamber and is separated therefrom by a baking hearth, the heating and baking chambers being connected with each other by relatively narrow air passages arranged respectively at the front and rear ends of said chambers. The bake oven of this invention is of the type of that shown in United States Letters Patent No. 2,122,397, issued to John M. Gantvoort July 5, 1938.

Bake ovens of the above mentioned type are often provided with more than one baking unit or deck and in such ovens the doors controlling the entrance to the baking chambers have, as heretofore constructed, been more or less of an inconvenience when placing goods to be baked into the baking chamber or when removing such goods from such chamber. This has been particularly true of the oven door for the upper deck owing to said door being extended outwardly from the front side of the oven in a substantially horizontal plane when in the open position so as to serve as a shelf and to the distance the door is spaced from the floor upon which the baker or attendant stands.

It is an object of this invention to provide a bake oven of the type above referred to with an improved mounting for the oven doors of the baking chambers whereby when a door is open the same will be maintained in substantially a horizontal plane below the bottom of the corresponding baking chamber and thus be maintained in a more convenient position and, at the same time, provide a shelf for supporting articles to be placed into the baking chamber or being taken from said chamber.

In bake ovens of the above mentioned type, cold air readily passes when the oven door is open through the return air passage connecting the front ends of the baking and heating chambers into the heating chamber and cooling said latter chamber owing to the close proximity of said air passage to the oven door.

Another object of the invention is to provide a bake oven with damper means for closing the return air passage connecting the baking and heating chambers when the oven door is open and thus prevent cooling of the heating chamber.

Still another object of the invention is to so connect the damper for the return air passage with the oven door that said damper will be moved to the closed position as the door is being opened and will be returned to the open position when the door is being closed.

A further object is to so position the damper at the upper end of the return air passage when said damper is closed that articles being placed into the baking chamber or being taken therefrom are prevented by said damper from accidentally falling into said air passage.

A still further object of the invention is to arrange the instruments for controlling and determining the operation of each baking unit where most accessible and to provide simple and inexpensive means for maintaining said instruments cool.

Yet another object of the invention resides in producing improvements in the construction and mounting of the fuel burner whereby increased life and efficiency of operation of the bake oven is obtained.

We attain these objects by mechanism illustrated in the accompanying drawing, in which:

Figure 1 is a perspective view of a double deck oven embodying the various features of this invention.

Figure 2 is a detailed vertical sectional view on an enlarged scale taken through the forward end of the bake oven at one end of a door substantially in the plane of line 2—2, Figure 1.

Figure 3 is a detail horizontal sectional view taken substantially in the plane of line 3—3, Figure 2, intermediate portions of the door and oven being broken away.

Figure 4 is a detail vertical sectional view taken on line 4—4, Figure 3.

Figure 5 is a plan view of our improved fuel burner, intermediate portions thereof being broken away.

The oven shown in Figure 1 is of the double deck type and is constructed of suitable insulated top, bottom, side, front and rear walls. The front wall, as 10, has a pair of openings 11 therein, one for each baking chamber 12. Each of the openings 11 is closed by a door 13 having a handle 14 by which the door is operated whereby access to the corresponding baking chamber is obtained. A heating chamber 16 is arranged beneath each baking chamber 12 and is separated therefrom by a suitable hearth 17. The chambers 12 and 16 are connected with each other at their front and rear ends by relatively narrow air passages, a front passage, as 18, being shown in Figure 2.

Beneath each heating chamber 16 is a combustion chamber 19 which is separated from the adjacent heating chamber 16 by a relatively thin wall or metal partition 20. The chambers 12, 16 and 19 and the walls of the oven are of the same general type as that described in the Gantvoort Patent No. 2,122,397 hereinabove referred to. Since the details of the oven proper do not constitute any part of the present invention, only its general construction and operation need be described, reference being had to the above mentioned patent for a more detailed disclosure of the structure and operation of this type of baking oven.

Each door 13 is provided with a pair of hinge or cheek members 22, each having a flat plate portion 23 which is secured to a corresponding end of a door 13 as by screws 24. The lower end of the plate portion 23 terminates in an arcuate portion 25 which extends downwardly through the return air passage 18 and then outwardly and upwardly, as at 26, toward the plate portion 23. The extension 26 has an aperture 27 extending therethrough which receives a hinge pintle 28 mounted in a pair of bearing members 29 and 30 secured to the front wall 10 of the oven, as shown in Figures 2 and 3. Each hinge or cheek member may, as shown, be provided with a re-enforcing member 32 secured, as by spot welding, to the inner side of the extension 26, or member 32 may be made integral with member 22. The member 32 also functions as a counterweight for urging the door to the closed position.

A spring 33 is shown mounted on each pintle 28 with one end connected with the bearing member 30 and the other end connected to the extension 26 for assisting member 32 in urging the door to its closed position. Each pair of pintles 28 is thus arranged in a plane beneath the bottom of the adjacent baking chamber 12, as clearly illustrated in Figure 2, and in the vertiplane of the door 13 when said door is in the closed position. It is thus evident that, as the door is moved to the open position, the same will be maintained in the horizontal plane passing through the pintles 28 and, therefore, beneath the bottom of the baking chamber 12. Each door is maintained in its open horizontal position against further downward movement by the engagement of a substantially flat surface 35 provided on the extension 26 adjacent the inner side of the pintles 28 with a stop bar 36 secured to the front wall 10 of the oven, as shown in Figure 2. This maintaining of each door 13, when open, in a horizontal position provides a convenient shelf for supporting material during the process of placing such material in the baking chamber 12 or when removing the same from said chamber. Furthermore, the positioning of each oven door in a plane beneath the bottom of the baking oven arranges the door beneath the line of vision when the articles are being placed into the baking chamber or removed therefrom, and thereby aids the baker or attendant when loading or unloading the baking chamber. This is particularly true with respect to the door provided for the upper deck or baking unit. Also, the door is more out of the way so that articles may be more readily placed directly into or removed directly from the oven.

In order that each return air passage 18 may be closed when the corresponding oven door 13 is in the open position and thus prevent relatively cold air entering the door opening 11 from passing downwardly through said air passage 18 into the heating chamber 16, we have provided each air passage with a damper 38. This damper is a flat substantially rectangular member adapted to extend through the air passage 18 from adjacent one hinge extension 26 to the extension 26 of the other hinge member, as clearly illustrated in Figure 3. Each damper 38 is of substantially the same width as an air passage 18 so that when the damper is in the horizontal position at the upper end of the passageway, as illustrated by broken lines in Figures 2 and 4, the passageway will be substantially closed by said damper. The damper 38 is hingedly connected with the door hinge members 22 as by a pair of pins 39 secured to the ends of said damper adjacent the lower edge thereof, when said damper is in the open position and which are received in suitable slots or recesses 40 provided in the arm extensions 26 and the re-enforcing members 32 of the hinge members.

Each damper 38 is also hingedly connected to the inner side wall of the air passage 18 adjacent thereto by a double hinge member 41. The hinge member 41 is arranged in this instance substantially midway between the ends of the damper 38 and is so constructed and connected to the damper and to the inner side wall 18' of the air passage 18 that when the door is in its closed position said damper will be maintained in a substantially vertical edgewise position adjacent the forward side of the air passage, as indicated by full lines in Figures 2 and 4, and when the door is in the open position, said damper will be in substantially a horizontal plane at the upper inlet end of the air passage 18 for closing said passage, as indicated by broken lines in said Figures 2 and 4.

The upper surface of the damper 38 when in the closed position is preferably in substantial alignment with the bottom of the baking chamber 12, that is, in alignment with the upper surface of the corresponding hearth member 17 so as to provide a substantially smooth continuous surface from said hearth member outwardly over the air passage 18.

The fuel burner, as 45, is mounted in the fire box or combustion chamber 19 as is usual in ovens of this type. This burner has the usual mixing chamber 46 to which fuel, as gas, is supplied by a pipe 47 and air is supplied through the usual adjustable cap or shutter 48. The burner proper in this case is T-shaped having a perforated head 49 which is connected with the mixing chamber 46 by a suitable tube 50 extending laterally therefrom substantially midway between its ends. The tube 50 is of substantially the same diameter as the perforated tube 49 and is preferably welded to the perforated tube 49 so as to provide substantially smooth flat upper and lower surfaces at the junction of these two members, as indicated in Figure 2.

In mounting the burner in the combustion chamber 19, the perforated burner tube 49 is placed upon a flat pad or board 52 mounted upon the bottom 19' of the combustion chamber 19. An angle iron, as 53, may be secured to the bottom of the chamber 19 for limiting the inward movement of the burner. The pad 52 is preferably composed of asbestos mill board or similar material to prevent burning and, at the same time, maintain a substantially air-tight connection between the bottom 19' of the combustion chamber and the burner tube 49 so that all secondary air supplied to the burner must pass over the top thereof and thereby come into direct contact with the flame from the burner. The insulating board 52 serves another purpose in that it maintains the bottom 19' at minimum temperature, thus tending to prevent it from warping as a result of becoming overheated and throwing the burner out of position. All or a substantial part of the secondary air is thus forced to serve in the combustion of the gas, thereby permitting a reduction of the air admitted for combustion and increasing the combustion efficiency. Furthermore, the combustion chamber is maintained at maximum temperature, thereby increasing the efficiency of the oven. At the same time, the mixing of substantially all of the secondary air with the flame increases the life of the burner by preventing carbonization about the burner ports and also helps to maintain the burner at maximum efficiency.

As indicated in Figure 1 of the drawing, the oven is provided with three panels 55, a lower panel arranged in registration with the combustion chamber 19 for the lower deck or baking unit, an intermediate panel arranged above the lower oven door 13 in registration with the combustion chamber 19 for the upper deck or baking unit, and an upper panel arranged above the door 13 for the upper deck or baking oven. Each panel 55 is a substantially U-shaped member in cross section and has the ends of the sides or legs thereof bent outwardly and secured to the front wall 10 of the oven substantially as shown in Figure 2. The transverse portion 56 of each panel 55 is thus spaced outwardly from the front wall of the oven to provide an air passage extending longitudinally of the panel and which is open at both ends to atmosphere. The inner side of the passages 57 of the two lower panels is in communication with the front ends of the combustion chambers 19, respectively, so that air supplied to each burner passes through the corresponding chamber 57 to the respective combustion chamber 19. Each of the two upper panels 55 is provided with suitable apertures for receiving the control instruments for governing the operation of a corresponding baking unit, such as a light switch 58 for an incandescent lamp 59 mounted in the baking chamber 12 at the upper side thereof, as indicated in Figure 2; a pilot light 60 usually provided to indicate when lamp 59 is burning and when the oven is in operation; a gas cock 70 for controlling the supply of gas to the corresponding burner 45; and a thermostatic control element 71. It will thus be understood that the passing of the outside air through the panel chambers 57 maintains the control instruments carried by said panels in a relatively cool condition so that the same will not be injured by the action of excessive heat escaping from the baking chamber 12 thereon. The air in cooling the instruments itself becomes preheated before passing into chamber 19 for combustion, thus tending to increase efficiency of combustion. The lower panel has no control instruments associated therewith but serves only as an air conduit for supplying air to the burner of the lower deck or baking unit. On the other hand, the upper panel while not in registration with a combuston chamber, is in registration with an air passage, as 73, formed in the front wall 10 of the oven at the upper end thereof through which air entering at the ends of the uppermost instrument panel may escape by natural draft and thereby maintain the instruments associated with said panel in a relatively cool state. It will be understood that the instruments mounted on the intermediate panel control the operation of the lower deck or heating unit, while the instruments mounted on the upper panel control the operation of the upper deck or heating unit.

While we have shown and particularly described the preferred embodiments of our invention, we do not wish to be limited to the exact construction shown as various changes both in the form and arrangement of the parts thereof may be readily made without departing from the spirit of the invention as set forth in the appended claims.

We claim:

1. In a baking oven of the class described having a baking chamber and a heating chamber arranged beneath the baking chamber and connected therewith by an air passage, in combination, a door for said oven arranged adjacent said passage to swing to and from a closed position, a damper in said passage, supporting means operatively connecting the damper with the door whereby said damper is supported by said door, guide means operatively connecting said damper with the oven, said supporting and guide means including pivotal members arranged to swing about the axis of swinging movement of the door and about a second axis arranged in fixed spaced relation to said door axis respectively, whereby the damper is moved from the open position extending longitudinally of the passage to and from a closed position extending transversely of said passage by movement of the door to and from its closed position.

2. In a baking oven of the class described having a baking chamber and a heating chamber arranged beneath the baking chamber and connected therewith by an air passage, a door for said baking chamber arranged adjacent the air passage, hinge means connected with the oven adjacent said passage pivotally connecting the door to said oven, a damper for said passage, means pivotally connecting the damper to said hinge means, guide means hingedly connecting the damper with said oven, said pivotal means and the guide means being so constructed and arranged that the damper is moved from an open position within the passage to a closed position extending across the upper end of said passage substantially flush therewith by movement of the door from the closed to the open position.

3. In a baking oven of the class described having a baking chamber, a door for said chamber and a heating chamber beneath the baking chamber connected therewith by an air passage arranged adjacent said door, in combination, a damper for said passage, separate supporting and guide means operatively connecting the damper to the door and to said oven for maintaining the damper in cooperative relation with said passage, said supporting and guide means including pivotal members so constructed and arranged in said passage that when the door is moved from the closed to the open position, the damper will be moved thereby from an open position within the passage to a closed position extending across the upper end of said passage and when said door is returned to said closed position, said damper will be returned thereby to its said open position.

WILLIAM C. AGNEW.
PAUL N. EVERTZ.